UNITED STATES PATENT OFFICE.

WILLIAM HENRY CORY, OF NEW YORK, N. Y., ASSIGNOR TO THE CORY ARTIFICIAL FUEL COMPANY.

ARTIFICIAL FUEL AND PROCESS OF MAKING THE SAME.

SPECIFICATION forming part of Letters Patent No. 332,497, dated December 15, 1885.

Application filed January 5, 1884. Renewed September 1, 1885. Serial No. 175,928. (No specimens.)

*To all whom it may concern:*

Be it known that I, WILLIAM HENRY CORY, a citizen of the United Kingdom of Great Britain and Ireland, and a resident of the city of New York, in the county of New York and State of New York, have invented certain new and useful Improvements in Artificial Fuel and the Process for Making the Same, of which the following is a specification.

My invention has for its object the forming into cakes or masses coal or coke dust, whereby the same may be readily handled and transported and be burned in furnaces, grates, and elsewhere as fuel. Charcoal or any carbonaceous dust may be used.

In carrying my invention into effect I mix with the coal-dust silicate of soda or potash and a small quantity of an acid, preferably in a dilute solution. Muriatic or any other acid will answer. These three ingredients, when mixed, form a compact mass which can be burned as fuel; but I prefer to compress it into molds of any desired size or shape, either by hydraulic or other pressure. This molding into any desired shape may be done by any of the well-known machines desired and used for compressing plastic materials—such as clay, &c.—and fuel compositions—such as peat, &c.—into blocks or spheres. After the ingredients have been thoroughly mixed and in the proper proportions, it is simply necessary to feed the resulting composition into the hopper or feeding-channel of such a machine. The action of the acid upon the silicate of potash or soda is to set the alkali free, and the silica thereby formed is of course insoluble in water and infusible by heat, and holds together the carbonaceous particles.

The proportion of silicate of potash or soda to coal-dust used which I prefer is about three to one hundred; but of course this proportion can be varied, and must be where the carbonaceous dust is porous, in which case more must be used. The best results will be obtained when only just enough of the silicate of potash or soda to hold the dust together during combustion is used. The amount of acid used of course depends upon the amount of silicate of potash or soda employed and the amount of alkali contained therein, the best results following the use of only just enough acid to set free the alkali in the silicate of potash or soda employed.

When lignite coal-dust is used, it is well to saturate it with water before mixing it with the other materials, on account of its porosity, by which it would otherwise absorb more of the silicate of potash or soda than is desirable or necessary. Small quantities of litharge, starch, or albuminous substances may also be added; but this or the saturation of the dust with water is not part of this invention.

It is obvious that I can use any kind of coal or carbonaceous dust, either alone or mixed, in practicing my invention, and that small coal may be mixed therewith.

After my new fuel is made, as above described, it is left to dry, after which it remains unchanged until used. It is of course compressed before drying, if it is desirable to compress it.

Having thus described my invention, what I claim is—

1. The within-described process of making artificial fuel, which consists in mixing together carbonaceous matter and silicate of soda or potash, subjecting the mixture to the action of an acid to set free the alkali of the potash or soda, and finally compressing the mass into cakes, substantially as described.

2. An artificial fuel consisting of carbonaceous matter, silicate of soda or potash, and an acid, such as muriatic acid, the silica being insoluble in water and infusible by heat, substantially as described.

Signed at the city of New York, in the county of New York and State of New York, this 4th day of January, A. D. 1884.

WILLIAM HENRY CORY.

Witnesses:
HENRY ARDEN,
GEO. T. HANNING.